United States Patent [19]

Song

[11] 4,446,411

[45] May 1, 1984

[54] OPTIMUM ACCELERATION/DECELERATION CIRCUIT

[75] Inventor: Hubert Song, Sunnyvale, Calif.

[73] Assignee: Verbatim Corporation, Sunnyvale, Calif.

[21] Appl. No.: 329,715

[22] Filed: Dec. 11, 1981

[51] Int. Cl.³ .............................................. G05B 19/40
[52] U.S. Cl. ..................................... 318/696; 318/807
[58] Field of Search ................... 318/696, 254, 254 A, 318/138, 685, 678, 616, 617, 620, 807–812

[56] References Cited

U.S. PATENT DOCUMENTS 3,553,549  1/1971  Leenhouts ........................... 318/696
4,016,472  4/1977  Leenhouts ........................... 318/696

Primary Examiner—G. Z. Rubinson
Assistant Examiner—Patrick C. Keane
Attorney, Agent, or Firm—Thomas E. Schatzel

[57] ABSTRACT

An optimum acceleration deceleration circuit for stepper motors wherein an error signal is fed to a rate limiter circuit which generates a speed output voltage. The speed output voltage is fed back to the rate limiter circuit through a non-linear gain amplifier and summing amps.

5 Claims, 3 Drawing Figures

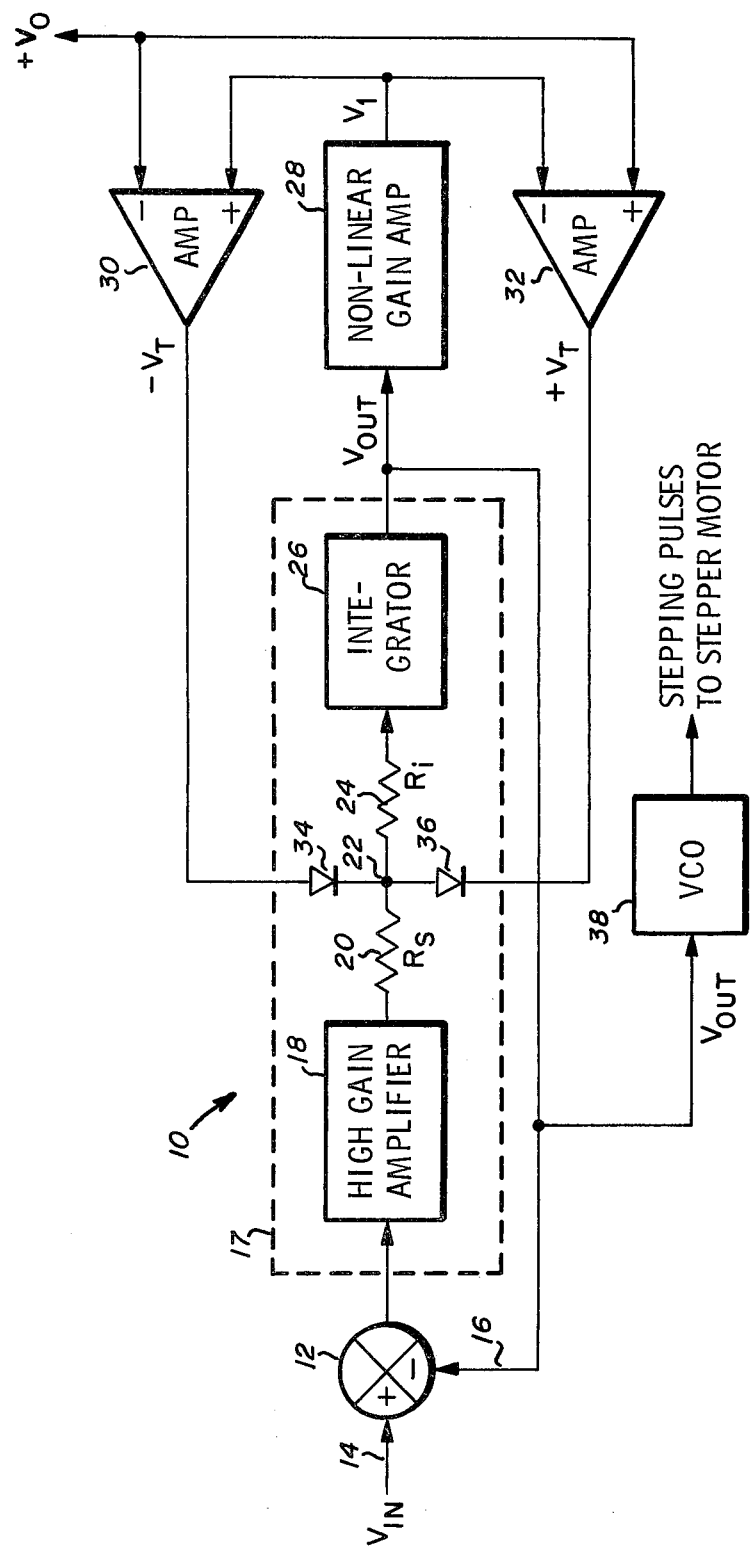
Fig_1

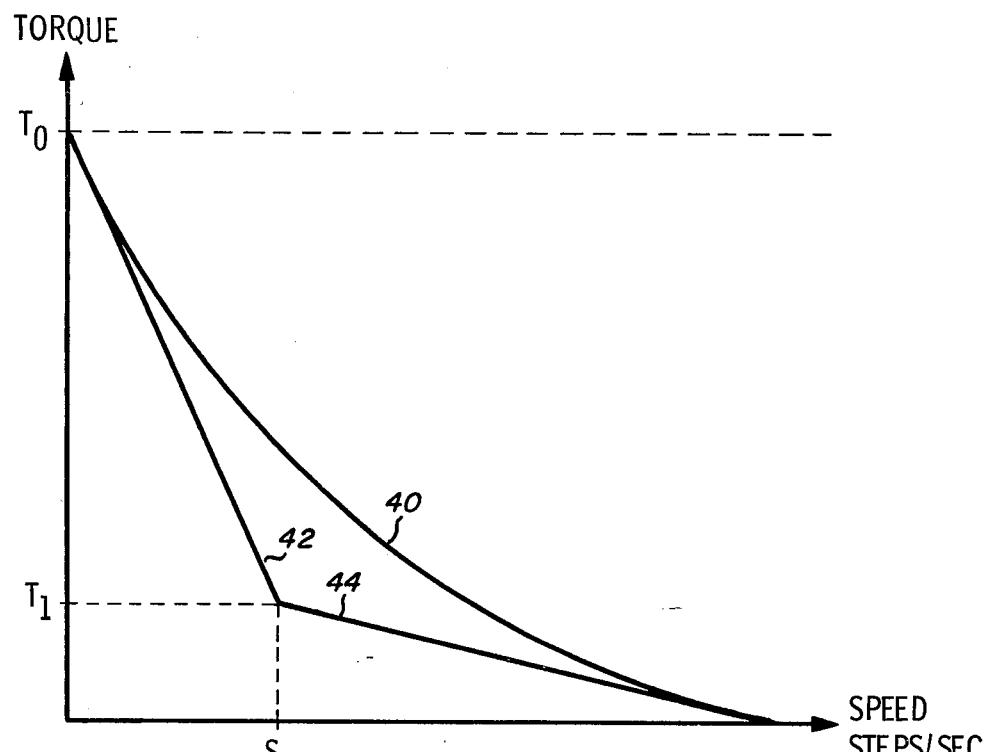
Fig_2
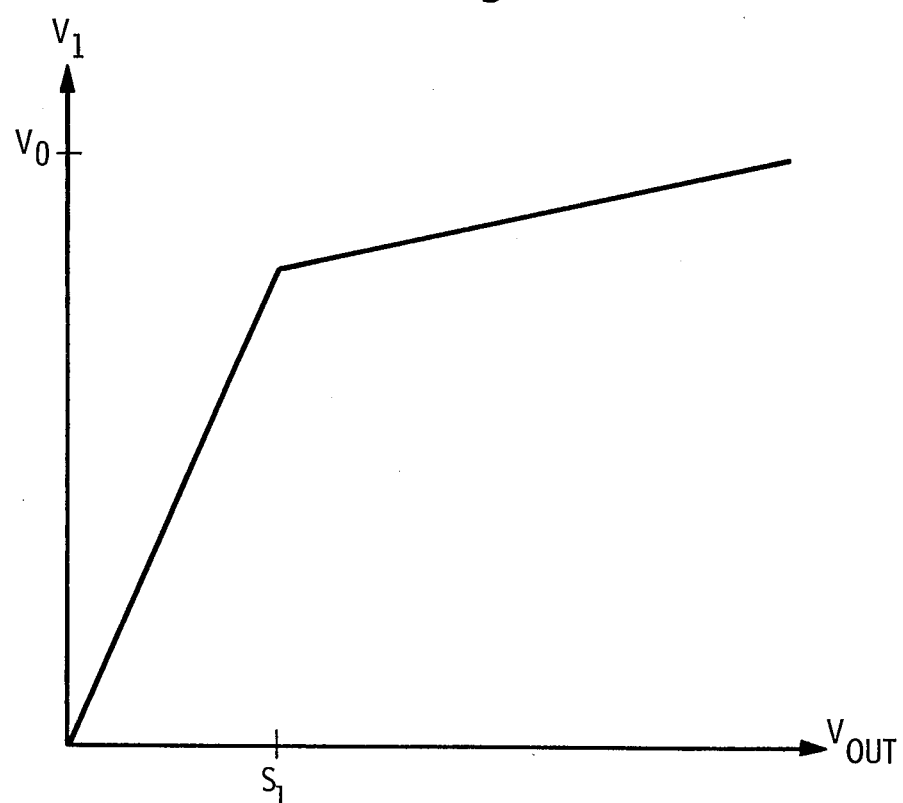
Fig_3

OPTIMUM ACCELERATION/DECELERATION CIRCUIT

BACKGROUND OF THE INVENTION

1. Field of the Invention

The invention relates generally to acceleration/deceleration circuits for generating stepping pulses for stepper motors and more particularly to an acceleration/deceleration circuit which is time independent and provides optimum acceleration and deceleration.

2. Description of the Prior Art

Stepper motors are widely used for discrete positioning control and there are numerous applications for discrete positioning. Many applications require moving thousands of steps from one position to another. One way of achieving this would be to stop after each pulse before providing the next pulse to the stepper motor. This would insure that no loss of steps occurs. However, the disadvantage is that this method of stepping is very slow.

An alternative method to move from one position to another involves accelerating the rate of pulses, without stopping between pulses, to reach a maximum pulse rate and then to decelerate the pulse rate so that the stepper motor stops at the desired position. This method of pulsing is referred to as slewing. However, if the rate of acceleration or deceleration of pulses is too great, steps will be missed resulting in the final position of the stepper motor being incorrect.

There are numerous techniques for acceleration/deceleration of stepper motors. Some of these techniques are described in the proceedings of the Seventh Annual Symposium on Incremental Motion Control Systems and Devices, 1978, pages B-29 through B-39.

SUMMARY OF THE PRESENT INVENTION

It is therefore an object of the present invention to provide an improved acceleration/deceleration circuit which optimizes the rate of acceleration and deceleration.

It is a further object to provide an improved acceleration/deceleration circuit having a high degree of accuracy.

It is a further object to provide an improved acceleration/deceleration circuit which may be produced at relatively low cost relative to comparable acceleration/deceleration circuits heretofore available.

Briefly, the present invention includes a nonlinear gain amplifier having gain characteristics corresponding to the speed-torque characteristics of a stepper motor. The output of the nonlinear gain amplifier is used to generate acceleration/deceleration voltages and modifies the speed profile through a feedback loop, which results in an accurate realization of optimum acceleration/deceleration control.

An advantage of the acceleration/deceleration circuit of the present invention is that acceleration and deceleration of stepper motors is optimized.

Another advantage is that the acceleration/deceleration circuit has a high degree of accuracy.

A further advantage is that the acceleration/deceleration circuit may be produced at relatively low cost compared to acceleration/deceleration circuits heretofore available.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a block diagram of an acceleration/deceleration circuit in accordance with the present invention;

FIG. 2 is a graph illustrating the typical torque-speed characteristics of a stepper motor; and FIG. 3 is a graph illustrating the gain characteristics of the non-liner gain amplifier.

DETAILED DESCRIPTION OF THE PREFERRED EMBODIMENT

FIG. 1 is a block diagram illustrating the acceleration/deceleration circuit of the present invention and referred to by the general reference numeral 10. The acceleration/deceleration circuit 10 includes a mixer 12 adapted to receive a voltage input signal 14 and a feedback signal 16. The voltage input signal 14 applied to the acceleration/deceleration circuit 10 determines the rate of stepping pulses generated by the circuit 10. The output of the mixer 12 is fed to a rate limiter circuit 17.

The rate limiter circuit 17 includes a high gain amplifier 18 which receives the output of the mixer 12. The output of the high gain amplifier 18 is connected to a resister 20. The resister 20 is then connected to a terminal 22 also having a resistor 24 connected to it. The resistor 24 is also connected to the input of an integrator 26. The output of the integrator 26, designated as $V_{out}$, serves as an output of the rate limiter 17 and input to a non-linear gain amplifier 28.

The output of the non-linear gain amplifier 28, designated $V_1$, is connected to the noninverting input of an operational amplifier 30 and to the inverting input of an operational amplifier 32. The inverting input terminal of the operational amplifier 30 and the noninverting input terminal of the operational amplifier 32 are connected to a reference voltage potential $+V_0$. The voltage outputs of the operational amplifiers 30 and 32 are designated $-V_T$ and $+V_T$, respectively.

The output terminal of the operational amplifier 30 is connected to the anode of a diode 34 of the rate limiter 17. The cathode of diode 34 is connected to the terminal 22. The terminal 22 is also connected to the anode of a diode 36 of the rate limiter 17. The cathode of diode 36 is connected to the operational amplifier 32.

The acceleration/deceleration circuit 10 also includes a voltage controlled oscillator 38 which receives its input from the output of the integrater 26. The output of the integrater 26 is also fed to the mixer 12 and comprises the feedback signal on the line 16. The voltage controlled oscillator 38 generates stepping pulses which are fed to the stepper motor.

FIG. 2 is a graph illustrating a typical torque-speed curve 40 of a stepper motor. The curve 40 indicates the amount of torque available for a given speed of the stepper motor. The curve 40 is approximated by a line 42 and a line 44 which are selected to be closely approximate the curve 40. The lines 42 and 44 are used in determining the gain characteristics of the non-linear gain amplifier 28.

FIG. 3 is a graph of the input voltage $V_{out}$ to the non-linear gain amplifier 38 versus the output voltage $V_1$ of the non-linear gain amplifier 28. As is well understood in the prior art, the rate of change of $V_{out}$ with respect to time for the rate limiter 17 is a constant times $V_T$.

The equation for the acceleration torque is:

$$T = J\alpha$$

where J is inertia and $\alpha$ is angular acceleration. Since $V_{out}$ is related to angular speed of the stepper motor, then $$\alpha = C_1 \frac{dV_{out}}{dt} \text{ and } T = C_2 \frac{dV_{out}}{dt}$$

For the rate limiter 17

$$\frac{dV_{out}}{dt} = C V_T \text{ or } \frac{dV_{out}}{dt} = C(V_0 - V_1)$$

Therefore, the torque may be expressed by the following equation:

$$T = K(V_0 - V_1)$$

An algebraic equation for torque may also be derived from FIG. 2 which will relate torque to $V_{out}$. Thus, from the two equations for torque the relationship between $V_{out}$ and $V_1$ may be derived to yield FIG. 3.

The operation of the acceleration/deceleration circuit 10 is believed to be as follows. The desired speed of the stepper motor is selected by the value of the voltage input signal on line 14. The actual speed of the stepper motor is determined by $V_{out}$ which is fed to the voltage controlled oscillator 38 and which is also the feedback signal on line 16. The output of the mixer 12 is an error signal which is the difference in voltages of the voltage input signal on line 14 and the feedback signal on line 16. If the output of the mixer 12 is a signal having a positive voltage, then the output of the high gain amplifier 18 will also be a positive voltage. The output voltage of the high gain amplifier 18 will be sufficient to cause the voltage at the terminal 22 to clamp at approximately the voltage output $+V_T$ of the operational amplifier 32. On the other hand, if $V_{in}$ is less than $V_{out}$ then the output of the high gain amplifier 18 will be a negative voltage. Likewise, the output of the high gain amplifier 18 will have a sufficiently negative amplitude to cause the voltage at the terminal 22 to clamp to approximately the output voltage $-V_T$ of the operational amplifier 30.

When the voltage clamped at the terminal 22 is approximately $+V_T$, current will flow into the integrator 26. As current flows into the integrator 26, the output voltage increases. When $V_{out}$ equals $V_{in}$ the output of the high gain amplifier 18 will be zero volts and no current will flow to the integrator 26. Thus, $V_{out}$ will be held constant until $V_{in}$ is changed again.

$V_{out}$ is the input to the non-linear gain amplifier 28 which generates the output voltage $V_1$. The relationship between $V_{out}$ and $V_1$ is shown in FIG. 3. The voltage $V_1$ increases in a non-linear fashion as the voltage $V_{out}$ increases. The output of the operational amplifier 32 is the difference between the fixed voltage $+V_0$ and $V_1$. Thus, the voltage $+V_T$ decreases as $V_{out}$ increases. As the voltage $+V_T$ decreases the voltage at the terminal 22 will decrease causing the current flowing into the integrater to also decrease. When the voltage at the terminal 22 is negative current will flow out of the integrater 26 causing the output voltage to decrease.

Since the gain of the non-linear gain amplifier 28 corresponds to the torque-speed curve 40, the acceleration of the stepper motor at any speed will closely approximate the maximum acceleration or deceleration possible.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An acceleration/deceleration circuit for stepper motors, comprising:

mixing means responsive to an input voltage and a speed output voltage for generating an error signal having a voltage approximately equal to the difference between said input voltage and said speed output voltage;

a rate limiter for generating said speed output voltage and responsive to said error signal whereby said speed output voltage increases when an acceleration control voltage is received by the rate limiter and said speed output voltage decreases when a deceleration control voltage is received by the rate limiter;

a non-linear gain amplifier connected to the output of the rate limiter responsive to said speed output voltage for developing a complementary control voltage;

first summing means connected to the output of the non-linear gain amplifier responsive to said complementary control voltage for generating said acceleration control voltage; and second summing means connected to the output of the non-linear gain amplifier responsive to said complementary control voltage for generating said deceleration control voltage.

2. The acceleration/deceleration circuit of claim 1, further comprising:

a voltage controlled oscillator responsive to said speed output signal for generating stepping pulses.

3. The acceleration/deceleration circuit of claim 1, wherein:

the rate limiter comprises a high gain amplifier responsive to said error signal, clamping means connected to the output of said high gain amplifier responsive to the output of said high gain amplifier for maintaining said acceleration control voltage when said error signal is positive and maintaining said deceleration control voltage when said error signal is negative, and integration means connected to the clamping means responsive to said acceleration control voltage or said deceleration control voltage for generating said speed output signal.

4. The acceleration/deceleration circuit of claim 3, wherein:

said clamping means comprises a first resistive element connected to the output of said high gain amplifier, a second resistive element connected between said first resistive element and said integration means, a first diode adapted to receive said deceleration control voltage and having its output connected to a node between said first and second resistive elements, and a second diode having its input connected to said node and its output adapted to receive said acceleration control voltage.

5. The acceleration/deceleration circuit of claim 4, wherein:

said first summing means comprises an operational amplifier having an inverting input adapted to receive a reference voltage and a noninverting input adapted to receive said complementary control voltage; and said second summing means comprises an operational amplifier having an inverting input adapted to receive said complementary control voltage and a noninverting input adapted to receive said reference voltage.

* * * * *